(12) United States Patent
Revelli, Jr. et al.

(10) Patent No.: US 6,410,930 B1
(45) Date of Patent: Jun. 25, 2002

(54) METHOD AND APPARATUS FOR ALIGNING A COLOR SCANNERLESS RANGE IMAGING SYSTEM

(75) Inventors: Joseph F. Revelli, Jr.; Lawrence A. Ray, both of Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 48 days.

(21) Appl. No.: 09/645,752

(22) Filed: Aug. 24, 2000

(51) Int. Cl.$^7$ ................................................. G01J 3/50
(52) U.S. Cl. ................................ 250/559.38; 356/5.01; 356/5.1
(58) Field of Search ..................... 250/559.38, 330; 356/5.01, 5.02, 5.03, 5.04, 5.05, 5.06, 5.07, 5.08, 5.09, 5.1, 5.11, 5.12, 5.13, 5.14, 5.15; 348/33

(56) References Cited

U.S. PATENT DOCUMENTS

| | | | |
|---|---|---|---|
| 4,935,616 A | 6/1990 | Scott | 250/213 |
| 5,177,556 A * | 1/1993 | Rioux | 356/326 |
| 6,252,659 B1 * | 6/2001 | Norita et al. | 356/613 |

* cited by examiner

*Primary Examiner*—Stephone Allen
*Assistant Examiner*—Bradford Hill
(74) *Attorney, Agent, or Firm*—David M. Woods

(57) ABSTRACT

An alignment method is provided for a color scannerless range imaging system whereby the separate optical paths of colored texture and monochromatic range images may be precisely aligned. The range imaging system includes an illumination system for illuminating a scene with modulated infrared illumination, image forming optics for forming an image of the scene, optical means for forming first and second optical paths between the image forming optics and an image sensor, a transponder subject to modulation located in the first optical path for amplifying and converting infrared light to visible light to form a range image on the image sensor. The alignment method includes the steps of providing a target having alignment indicia that can be imaged in both infrared and visible regions of the spectrum, capturing an infrared image of the target using the first optical path, capturing a color image of the target using the second optical path, and adjusting at least one of the optical paths so that the captured images are coincident.

9 Claims, 4 Drawing Sheets

METHOD AND APPARATUS FOR ALIGNING A COLOR SCANNERLESS RANGE IMAGING SYSTEM

FIELD OF THE INVENTION

The present invention relates to range imaging systems, and more particularly to range imaging systems employing scannerless range imaging techniques.

BACKGROUND OF THE INVENTION

U.S. Pat. No. 4,935,616 describes a scannerless range imaging (SRI) system using an amplitude-modulated high-power laser diode to completely illuminate a target scene. Conventional optics confine the target beam and image the target onto a receiver. The range to the target is determined by measuring the phase shift of the reflected light from the target relative to the amplitude-modulated carrier phase of the transmitted light. To make this measurement, the gain of an image intensifier within the receiver is modulated at the same frequency as the transmitter, so the amount of light reaching the receiver is a function of the range-dependent phase difference. A second image is then taken without receiver or transmitter modulation and is used to eliminate non-range-carrying intensity information. Both captured images are registered spatially, and a digital processor is used to operate on these two frames to extract range. Consequently, the range associated with each pixel is essentially measured simultaneously across the whole scene.

The device described in the '616 patent uses a two-dimensional array of detectors (such as a charge-coupled device (CCD) image sensor) that simultaneously captures range information of all of the elements in a two-dimensional projection of a three-dimensional scene. Periodically modulating the illumination source and simultaneously modulating the gain of the receiver accomplish this. The receiver is comprised of a photocathode, which converts incoming photons to a multiplicity of parallel electron streams; a micro-channel plate, which amplifies the electron streams; and a phosphor screen, which converts the electron streams back to visible radiation. The image formed by the phosphor screen is imaged onto the CCD sensor. Modulating the gain of the micro-channel plate causes a modulation of the intensity of the image appearing on the CCD sensor. Beating of the modulation of the light reflected from the object against the modulation of the receiver gain results in an image, each pixel of which has an amplitude that is proportional to the cosine of a phase shift between the reflected light and the receiver modulation. This phase shift in turn is proportional to the range of the corresponding object point. The range of each object point can be computed and a monochromatic range image can be formed wherein the intensity of each pixel in the image is proportional to the range of the corresponding object point from the camera.

The preferred method of estimating the range in the '616 patent uses a pair of captured images, one image with a destructive interference caused by modulating the image intensifier, and the other with the image intensifier set at a constant voltage. However, a more stable estimation method uses a series of at least three images, each with modulation applied to the image intensifier, as described in commonly assigned copending application Ser. No. 09/342,370, entitled "Method and Apparatus for Scannerless Range Image Capture Using Photographic Film" and filed Jun. 29, 1999 in the names of Lawrence Allen Ray and Timothy P. Mathers. In that application, the distinguishing feature of each image is that the phase of the image intensifier modulation is unique relative to modulation of the illuminator. If a series of n images are to be collected, then the preferred arrangement is for successive images to have a phase shift of $$\frac{2\pi}{n}$$

radians (where n is the number of images) from the phase of the previous image. The resultant set of images is referred to as an image bundle. The range at a pixel location is estimated by selecting the intensity of the pixel at that location in each image of the bundle and performing a best fit of a sine wave of one period through the points. The phase of the resulting best-fitted sine wave is then used to estimate the range to the object based upon the wavelength of the illumination frequency.

An image intensifier operates by converting photonic energy into a stream of electrons, amplifying the number of electrons and then converting the electrons back into photonic energy via a phosphor plate. If it is desired to produce a normal brightness image (herein called a texture image) the device described in the '616 patent can be operated with the modulation to the micro-channel plate turned off. Although both the texture and range images are precisely aligned (due to the common optical path shared by both images), one consequence of this process is that color texture information is lost. Since color is a useful property of images for many applications, a means of acquiring the color information that is registered along with the range information is extremely desirable.

It is possible to use multiple optical pathways in the receiver of a SRI so that a colored texture image and a monochromatic range image can both be formed on a single image sensor. Such an approach is described in detail in commonly assigned copending application Ser. No. 09/572,522, entitled "Method and Apparatus for a Color Scannerless Range Image System" and filed May 17, 2000 in the names of Lawrence Allen Ray and Louis R. Gabello, and which is incorporated herein by reference. In this system, a primary optical path is established for directing image light toward a single image responsive element. A modulating element, e.g., a micro-channel plate, is operative in the primary optical path to receive an infrared component of the image light and a modulating signal, and to generate a processed infrared component with phase data indicative of range information. A secondary optical path is introduced, which routes the visible color texture image around the micro-channel plate in the primary optical path. A system of lenses, beamsplitters, and mirrors can be used to form the second optical path, and a shutter can be employed in the second optical path to switch the light on and off in the path. Although this modification would enable the capture of range and colored texture images with a single CCD sensor, it introduces the problem of possible misalignment of the range and texture images. As a consequence, depth information cannot be accurately assigned to each point in the colored texture image.

There is a need therefore for a method whereby the colored texture and range images in a color SRI camera system can be precisely aligned.

SUMMARY OF THE INVENTION

The need is met according to the present invention by providing a method of aligning a color scannerless range imaging system of the type having an illumination system for illuminating a scene with modulated infrared illumination, a color image sensor, image forming optics for forming an image of the scene, an optical arrangement for forming first and second optical paths between the image forming optics and the image sensor, and a transponder subject to modulation located in the first optical path for amplifying and converting infrared light to visible light to form a range image on the image sensor. The method includes the steps of providing a target having alignment indicia that can be imaged in both infrared and visible regions of the spectrum, capturing an infrared image of the target using the first optical path, capturing a color image of the target using the second optical path; and adjusting at least one of the optical paths so that the captured images are coincident.

TECHNICAL ADVANTAGE

This invention provides a technique whereby the colored texture and monochromatic range images in a SRI system having separate optical paths for the color and range images and a single color image sensor can be precisely aligned.

DETAILED DESCRIPTION OF THE INVENTION

Because range imaging devices employing laser illuminators and capture devices including image intensifiers and electronic sensors are well known, the present description will be directed in particular to elements forming part of, or cooperating more directly with, apparatus in accordance with the present invention. Elements not specifically shown or described herein may be selected from those known in the art. Certain aspects of the embodiments to be described may be provided in software. Given the system as shown and described according to the invention in the following materials, software not specifically shown, described or suggested herein that is useful for implementation of the invention is conventional and within the ordinary skill in such arts.

Figure 1:
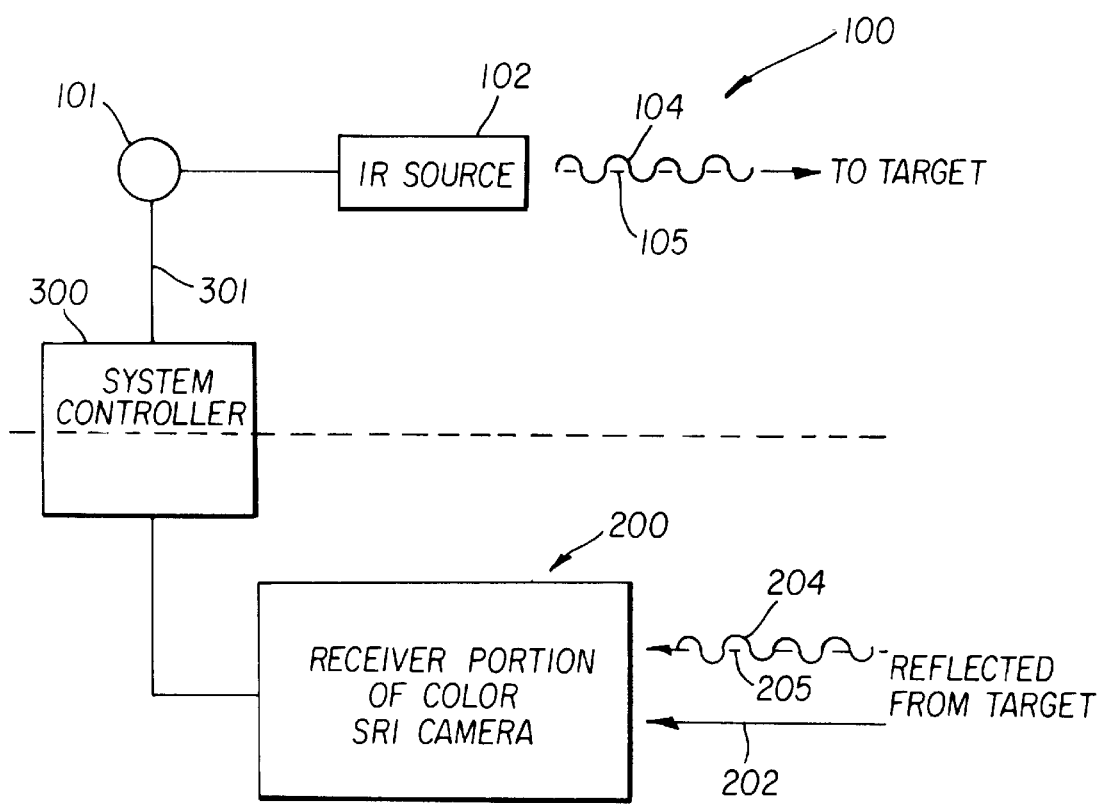
FIG. 1 is a schematic diagram useful in describing the practice of the present invention.

FIG. 1 is a schematic diagram showing the overall operation of the color SRI camera system according this invention. The color SRI camera is comprised of a transmitter 100, a receiver 200 and a controller 300. An infrared (IR) beam is generated by an IR source 102 which is modulated by a driver 101 such that the amplitude of the output beam contains both RF and DC components as indicated by reference numbers 104 and 105, respectively. The RF level, DC level, and phase shift of the driver 101 is controlled by the controller 300 via a control line 301. After reflection from a target, ambient visible light 202 and the RF and DC components 204 and 205, respectively, of the modulated IR beam are made incident on the receiver 200 of the SRI camera. The controller 300 also provides control signals to the receiver 200.

Figure 2:
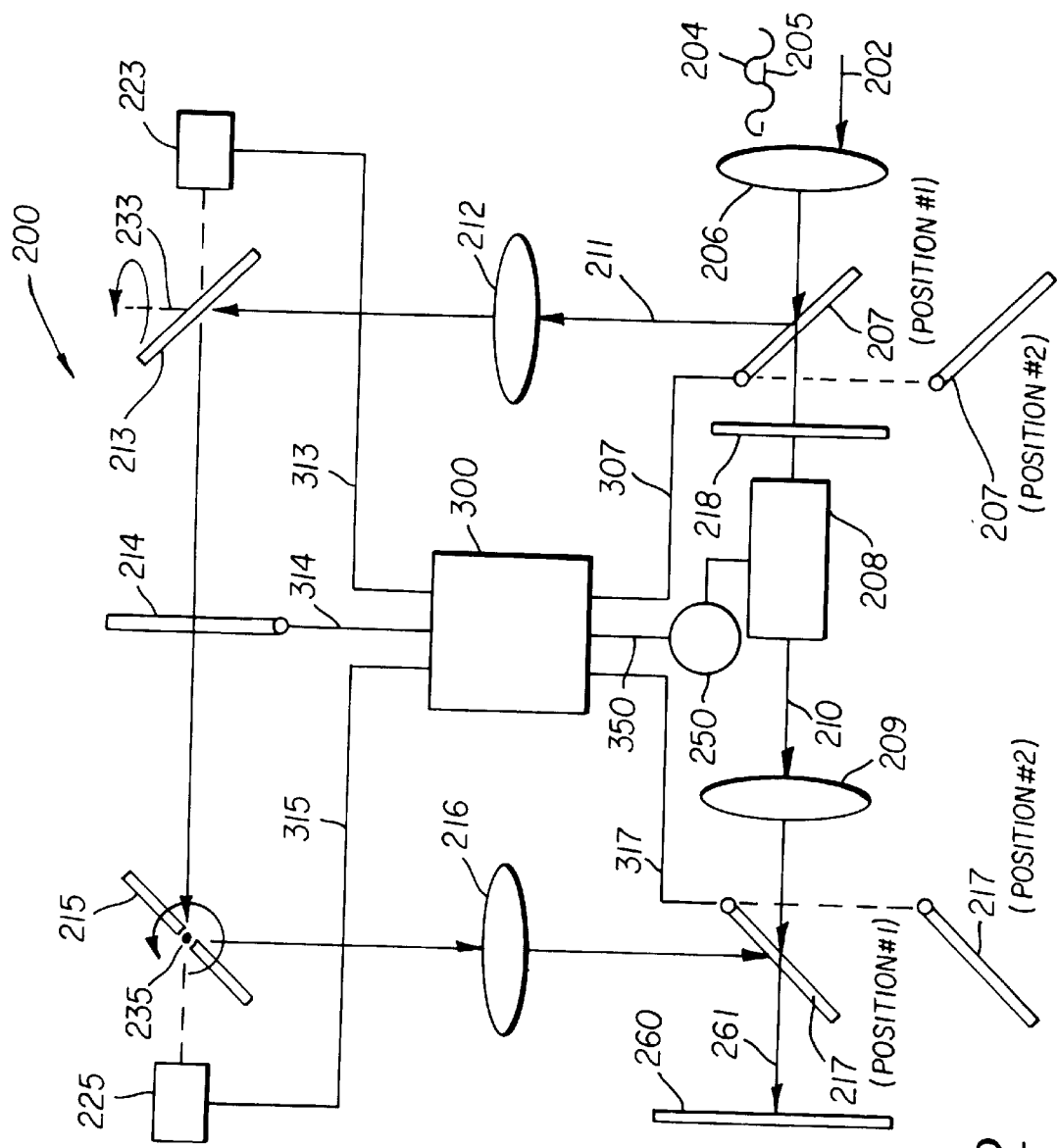
FIG. 2 is a schematic diagram of the receiver of a color scannerless ranging system shown in FIG. 1.

FIG. 2 is a schematic diagram showing the details of the receiver 200. This figure illustrates the basic means for obtaining aligned color texture and range images in a color SRI camera. A dichroic beam splitter 207 (also known as a "cold mirror") is introduced in a primary optical path 210 between a capture lens 206 along with a transponder capable of being modulated, such as a transducer/amplifier 208. The transducer/amplifier 208 serves to convert IR to visible radiation and simultaneously to intensify the input image sinusoidally in time. A photocathode in combination with a micro-channel plate and a phosphor screen is an example of such a transducer/amplifier. The monochromatic visible output of the transducer/amplifier 208 is subjected to modulation by a driver 250 such that the amplitude of the monochromatic visible output image can vary in intensity over time with both RF and DC components. The visible image produced at the output of the transducer/amplifier 208 is hereafter referred to as the visible monochrome IR image. The driver 250 also is capable of introducing a phase shift in the RF component. The RF frequency of the transducer/amplifier 208 is preferably the same as that of the IR source. The controller 300 provides signals to control the RF level, DC level, and phase shift of the driver 250 via a control line 350.

A beam splitter 207 has the property that it transmits light in the infrared and reflects light in the visible portion of spectrum. A system of relay lenses 212, 216 and adjustable mirrors 213, 215 form a secondary optical path 211 that allows a color texture image to be routed around the transducer/amplifier 208. As defined above, the transducer/amplifier 208 is necessary for the range image capture but it precludes transmission of color information. It will be appreciated that an additional narrow band IR transmission filter 218 could be placed in the primary optical path 210 in order to limit the amount of ambient IR light outside the band of IR source 102. The transmission characteristics of the filter 218 are chosen to match the spectral content of the IR source 102.

A beam combiner 217 is introduced in the primary optical path 210 between an imaging lens 209 and a color image sensor 260. The color image sensor could be a charge-coupled device (CCD) image sensor with a color filter array, for example. The beam combiner 217 transmits a portion of the visible monochrome IR image and simultaneously reflects a portion of the visible color texture image so that the images in both the primary and secondary optical paths may be directed to the image sensor 260. Servomotors (not shown in diagram) move the beam splitter 207 and/or the beam combiner 217 in or out of the primary optical path in response to control signals sent by the system controller 300 via control lines 307 and 317, respectively. Furthermore, a shutter 214 is included in the secondary optical path so that the color texture image can be "turned off" during range image formation.

Figure 4A:
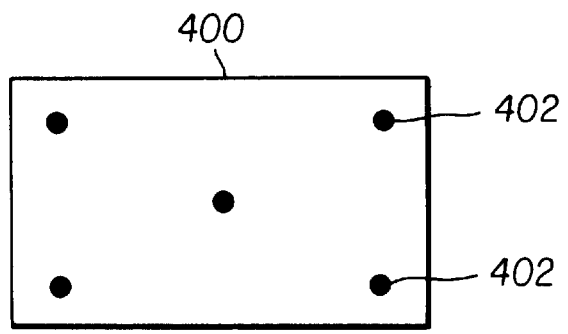
FIGS. 4a, 4b and 4c are diagrams useful in describing the alignment method of the present invention.

The system operates in the following manner. The SRI camera is initially aligned using an alignment target 400 (see FIG. 4a). The alignment target 400 can be as simple as a uniformly white (black) background that occupies a reasonable portion of the field of view of the imager. In addition, the alignment target 400 should have a small number of alignment indicia, such as reference black (white) dots 402 distributed evenly over the background. The alignment target pattern must be detectable in the infrared as well as the visible region of the spectrum. The alignment target could even be the scene itself providing that there are a sufficient number of distinct reference points serving as alignment indicia that are detectable in both the visible and infrared regions of the spectrum.

Referring back to FIG. 2, if the transducer/amplifier 208 is energized with only DC power (i.e., RF modulation is removed), the output image produced by the transducer/amplifier 208 will be a monochromatic visible version of the IR image of the target 400 that does not vary in time. Furthermore, both visible color texture and the visible monochrome IR images of the alignment target are formed simultaneously on the image sensor 260 if the SRI camera is operated with the cold mirror 207 and the beam combiner 217 in respective position(s) #1 and the shutter 214 open, as shown in FIG. 2. The two adjustable mirrors 213 and 215 are designed to rotate about mutually orthogonal axes 233 and 235, respectively. Servomotors 223 and 225, respectively, cause the rotation in response to signals from the controller 300 via control lines 313 and 315, respectively. Rotation of one of the adjustable mirrors, e.g., the mirror 213, about its axis causes the visible color texture image to translate along the x-axis of the image sensor relative to the visible monochrome IR image. Rotation of the other adjustable mirror, e.g., the mirror 215, results in a translation of the visible color texture image along the y-axis of the image sensor relative to the visible monochrome IR image. An operator can view the two superimposed images by displaying the image sensed by the CCD image sensor 260. The two mirrors 213 and 215 are manually adjusted via the servomotors 223 and 225, respectively, to precisely align the superimposed visible color texture and visible monochrome IR images in the secondary and primary image paths respectively.

Figure 3:
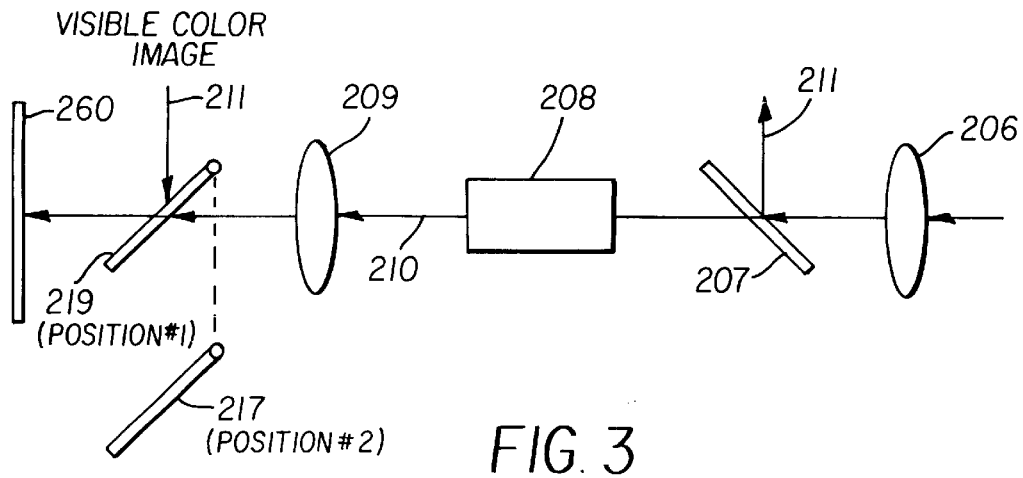
FIG. 3 is a schematic diagram of the primary optical path of the receiver of a scannerless ranging system shown in FIG. 1 according to an alternative embodiment of the invention.

After alignment is completed, the alignment target 400 is removed and a color texture image of a scene is captured with the transducer/amplifier 208 turned off, the cold mirror 207 and the beam combiner 217 in respective position(s) #1, and the shutter 214 open. It should be appreciated that instead of the turning off the transducer/amplifier 208, it is also possible to include an additional mirror 219 that can be moved into position #1 during capture of the texture image, as shown in FIG. 3. Mirror 219 is blackened on the side facing away from the image sensor 260 so that it acts as a stop for the visible monochrome IR image. Both the beam combiner 217 and the mirror 219, for example, could be rigidly attached to a third member that is constrained to move in a direction perpendicular to the plane of the diagram in FIG. 2. This motion would result in placement of the beam combiner 217, the mirror 219, or nothing at all at the intersection of the primary and secondary optical paths as shown schematically in FIG. 3. This alternative embodiment has the additional advantage that 100% of the light from the color texture image is directed to the image sensor 260 as opposed to only 50% of the light as would be the case if beam combiner 217 were in position #1. The chief disadvantage is the additional complexity introduced by the requirement for an additional moveable element.

The range image is captured after the color texture image has been captured. In this mode of operation, the shutter 214 in the secondary optical path 211 is closed and the beam combiner 217 is removed from the primary optical path 210 by moving it into position #2. (Note that mirror 219 in the alternative embodiment must also be removed from the primary optical path.) In this case, the transducer/amplifier 208 is operated with both DC power and RF power energized. Note the beam combiner 217 could be left in position #1 during range image capture at the expense of lower transmission of the range image. In addition, the cold mirror 207 could be moved to position #2 during range image capture, although this really should not be necessary since this element should be nearly transparent to infrared light which is used to capture the range image. The range image is computed as described in the aforementioned commonly assigned copending application Ser. No. 09/342,370, which is incorporated herein by reference. This is accomplished by capturing at least three so-called "phase" images such that a different known phase shift is introduced between the sinusoidal IR illumination and the sinusoidal modulation of the transducer/amplifier for each of the phase images. The range associated with each pixel can then be computed from the known phase shifts and the intensities measured for the pixel from the phase images.

It will be appreciated that the capture of the range and color texture images does not have to be in a particular order. That is, the range image could be captured before the color texture image.

Figure 5:
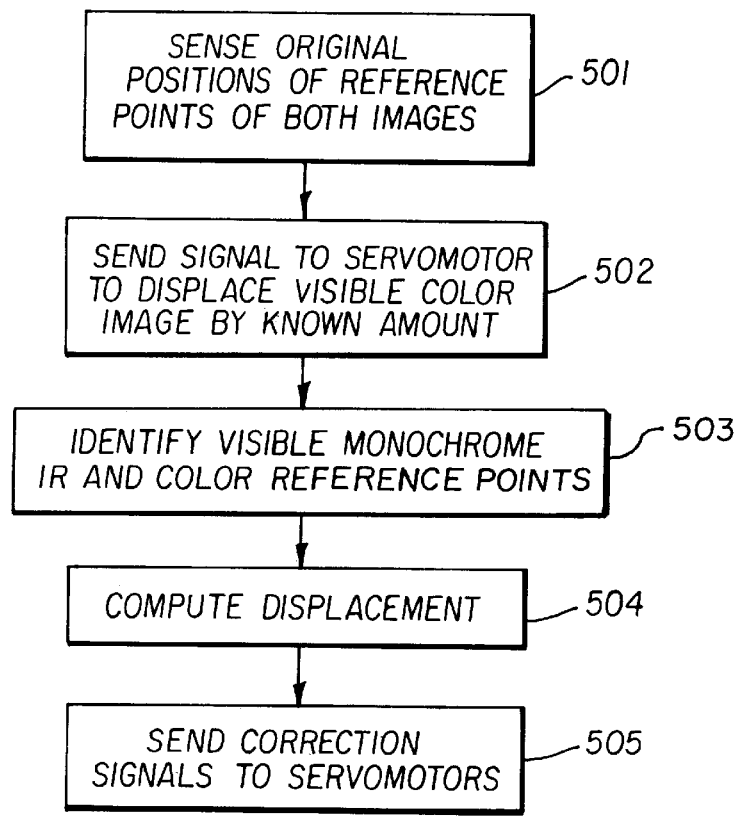
FIG. 5 is a flow chart illustrating an automatic alignment method of the present invention.

Referring to FIG. 4 and FIG. 5, it will be appreciated that the alignment mode can be accomplished automatically. The servomotors 223 and 225 are provided for adjusting the mirrors 213 and 215, respectively. The servomotors 223 and 225 are controlled by the controller 300 via the control lines 313 and 315, respectively. In this embodiment of the invention, the locations of the superimposed reference points in the visible color texture and visible monochrome IR images are detected and stored. The detection of the reference points is accomplished in the following manner.

Figure 4B:
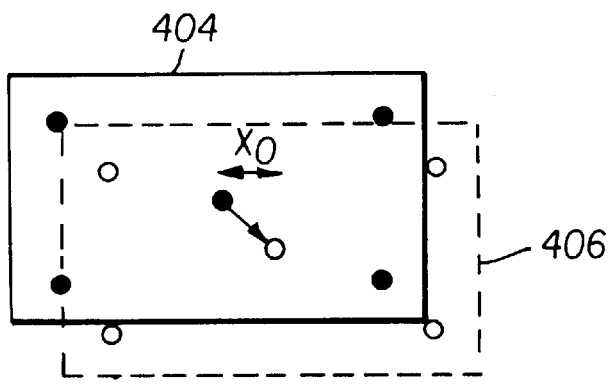
Figure 4C:
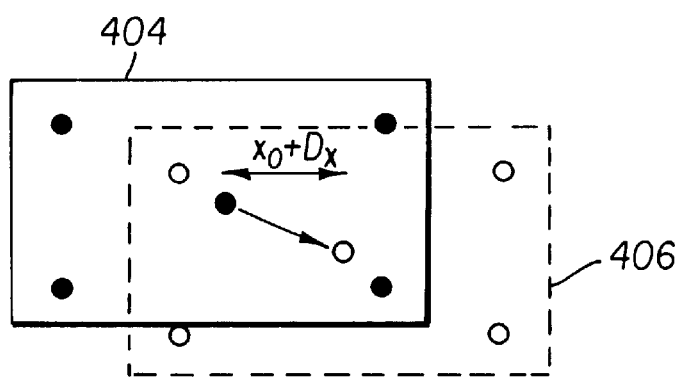

In FIGS. 4b and 4c, reference numbers 404 and 406, respectively, indicate the visible color texture and visible monochrome IR images of the alignment target. FIG. 4b shows an initial misalignment between the two images, which is to be corrected. The quantity $x_o$ in FIGS. 4b and 4c represents the component of the initial misalignment along the x-axis. Since in an automatic process it is not initially determinable which image is the color texture image, the x-axis servomotor causes a translation of the visible color texture image relative to the visible monochrome IR image by a known amount, $\Delta x$, in the x-direction. FIG. 4c shows the images after the translation. Since only the locations of color texture reference points should have changed by the known amount, these points can be easily distinguished from the fixed reference points in the visible monochrome IR image. As would be clear to anyone of ordinary skill in this art, a simple computational routine may used to both identify corresponding reference points in the two images and compute the initial misalignment. Once the initial misalignment has been computed, it is processed by the controller 300 and converted to a correction signal. This correction signal is then fed back to the x-axis and y-axis servomotors 223 and 225, which cause the adjustable mirrors 213 and 215 to rotate about their respective axes minimize the displacement. The process flow chart is shown in FIG. 5. Reference numbers 501, 502, 503, 504, and 505 indicate the individual process steps for automatic alignment according to this embodiment of the invention. It will be appreciated that an alternative method for automatically distinguishing the superimposed visible and IR alignment images is by switching off one or the other of these images.

Finally, it should be mentioned that the controller 300 is responsible for handling usual operations such as phase offsets, timing, and modulation of the IR source 102 and the transducer/amplifier 208. It addition it must operate the shutter 214, the x-axis 213 and y-axis 215 mirror servomotors, and the servomotors (not shown) that reposition the beam combiner 217, the mirror 219 and the cold mirror 207. The controller 300 also includes hardware and software for any computations that must be carried out.

It will be appreciated that motion of the reference points in the visible color texture image relative to those in the visible monochrome IR image could also be accomplished by causing rotation of the beam splitter 207 and the beam combiner 217 about mutually orthogonal axes while keeping the mirrors 213 and 215 rigidly fixed.

The invention has been described in detail with particular reference to certain preferred embodiments thereof, but it will be understood that variations and modifications can be effected within the spirit and scope of the invention.

PARTS LIST

- 100 IR transmitter portion of color SRI camera
- 101 DC and RF driver for IR source
- 102 IR source
- 104 RF component of modulated IR beam
- 105 DC component of modulated IR beam
- 200 Receiver portion of color SRI camera
- 202 Ambient visible light reflected off of target and incident on color SRI camera receiver
- 204 RF component of modulated IR beam that has been reflected off of target and is incident on SRI camera receiver
- 205 DC component of modulated IR beam that has been reflected off of target and is incident on color SRI camera receiver
- 206 Capture lens
- 207 Dichroic beam splitter (cold mirror)
- 208 Transducer/amplifier
- 209 Imaging lens
- 210 Primary optical path
- 211 Secondary optical path
- 212 Relay lens
- 213 Adjustable mirror for x-axis motion
- 214 Shutter
- 215 Adjustable mirror for y-axis motion
- 216 Relay lens
- 217 Beam combiner
- 218 Optional IR filter with transmission characteristics matched to IR source
- 219 Moveable mirror associated with another embodiment of the invention
- 223 Servomotor for causing rotation of mirror used for x-axis adjustment
- 225 Servomotor for causing rotation of mirror used for y-axis adjustment
- 233 Axis of rotation of adjustable mirror which causes x-axis motion
- 235 Axis of rotation of adjustable mirror which causes y-axis motion
- 250 DC and RF driver for transducer/amplifier
- 260 color CCD image sensor
- 261 Superimposed visible color texture and visible monochrome IR images
- 300 System controller
- 301 Control line to DC and RF driver for IR source
- 307 Control line to servomotor that moves cold mirror
- 313 Control line to servomotor that rotates x-axis mirror
- 314 Control line to shutter
- 315 Control line to servomotor that rotates y-axis mirror
- 316 Control line to servomotor that moves bearn combiner
- 350 Control line to DC and RF driver for transducer/amplifier
- 360 Data line connecting output of image sensor to system controller
- 400 Target used for color SRI alignment
- 402 Reference dots on alignment target
- 404 Visible monochrome IR image of alignment target
- 406 Visible color texture image of alignment target
- 501 Step number one in flow chart for automatic alignment process
- 502 Step number two in flow chart for automatic alignment process
- 503 Step number three in flow chart for automatic alignment process
- 504 Step number four in flow chart for automatic alignment process
- 505 Step number five in flow chart for automatic alignment process

What is claimed is:

1. A method of aligning a color scannerless range imaging system of the type having an illumination system for illuminating a scene with modulated infrared illumination, a color image sensor, image forming optics for forming an image of the scene, an optical arrangement for forming first and second optical paths between the image forming optics and the image sensor, a transponder subject to modulation that is located in the first optical path for amplifying and converting infrared light to visible light to form a range image on the image sensor, said method comprising the steps of:

a) providing a target having alignment indicia that can be imaged in both infrared and visible regions of the spectrum;

b) capturing an infrared image of the target using the first optical path;

c) capturing a color image of the target using the second optical path; and d) adjusting at least one of the optical paths so that the captured images are coincident.

2. The method as claimed in claim 1 wherein the optical arrangement includes one or more optical elements in the second path for controlling the path of the color image, and wherein step d) includes adjusting the one or more optical elements until the captured images are coincident.

3. The method as claimed in claim 2 wherein the one or more optical elements include first and second adjustable mirrors that are separately adjustable in x and y directions for controlling the path of the color image.

4. The method as claimed in claim 1 wherein the optical arrangement includes one or optical elements in the first path for controlling the path of the color image, and wherein step d) includes adjusting the one or more optical elements until the captured images are coincident.

5. The method as claimed in claim 1 wherein the color scannerless range imaging system includes a controller and wherein step d) includes having the controller automatically adjust at least one of the optical paths so that the captured images are coincident.

6. A color scannerless range imaging system for capturing both color and range information of a scene, said range imaging system comprising:

an illumination system for illuminating the scene with modulated infrared illumination;

a color image sensor;

image forming optics for forming an image of the scene;

an optical arrangement for forming first and second optical paths between the image forming optics and the image sensor for capturing both color and range images of the scene, said optical arrangement including one or more adjustable optical elements in at least one of the optical paths;

a transponder subject to modulation that is located in the first optical path for amplifying and converting infrared light to visible light to form a range image on the image sensor; and one or more drive components for adjusting said one or more optical elements so that the captured images are coincident.

7. The system as claimed in claim 6 wherein the one or more adjustable optical elements include first and second adjustable mirrors in the second optical path that are separately adjustable in x and y directions for controlling the path of the color image.

8. The system as claimed in claim 7 wherein the one or more drive components comprise servomotors connected to the adjustable mirrors.

9. The system as claimed in claim 8 further including a controller for automatically adjusting the servomotors with respect to a target containing alignment indicia so that the captured images are coincident.

* * * * *